United States Patent
Zhang et al.

(10) Patent No.: US 12,435,010 B1
(45) Date of Patent: Oct. 7, 2025

(54) 4-IODOPYRAZOLE COORDINATION COMPOUND AND PREPARATION METHOD AND USE THEREOF

(71) Applicant: Institute of Applied Ecology, Chinese Academy of Sciences, Shenyang (CN)

(72) Inventors: Lei Zhang, Shenyang (CN); Lili Zhang, Shenyang (CN); Wenlong Duan, Shenyang (CN); Cong Ma, Shenyang (CN); Yuanliang Shi, Shenyang (CN); Shuang Zhang, Shenyang (CN)

(73) Assignee: Institute of Applied Ecology, Chinese Academy of Sciences, Shenyang (CN)

( * ) Notice: Subject to any disclaimer, the term of this patent is extended or adjusted under 35 U.S.C. 154(b) by 0 days.

(21) Appl. No.: 19/090,966

(22) Filed: Mar. 26, 2025

(30) Foreign Application Priority Data

Apr. 7, 2024 (CN) .......................... 202410405372.6

(51) Int. Cl.
*C05C 11/00* (2006.01)
*C05C 9/00* (2006.01)
(Continued)

(52) U.S. Cl.
CPC ................ *C05C 11/00* (2013.01); *C05C 9/00* (2013.01); *C05G 3/90* (2020.02); *C07F 1/08* (2013.01)

(58) Field of Classification Search
CPC ... C05C 9/00; C05C 11/00; C05G 3/90; C07F 1/08
See application file for complete search history.

(56) References Cited

U.S. PATENT DOCUMENTS

| 3,635,690 A | * | 1/1972 | Griffith | .................... C05G 3/90 71/902 |
| 4,522,642 A | | 6/1985 | Arndt et al. | |
| 2015/0158749 A1 | * | 6/2015 | Gellert | .................... C07F 1/08 210/729 |

FOREIGN PATENT DOCUMENTS

| CN | 85104656 A | 12/1986 |
| CN | 108467494 A | 8/2018 |
| (Continued) | | |

OTHER PUBLICATIONS

Song Ge; Sun, Qiao; Hou, Ya-nan; Zhang, Rui; Wei, Dong-ming; Shi, Zhan; Xing, Yong-heng; "Synthesis, structure and quantum chemistry study of the 4-iodopyrazole copper complexes", Wuji Huaxue Xuebao (2013), 29 (10), 2150-2156.*

(Continued)

*Primary Examiner* — Wayne A Langel
(74) *Attorney, Agent, or Firm* — Hong Lundvall

(57) ABSTRACT

Disclosed are a 4-iodopyrazole coordination compound and a preparation method and use thereof. The preparation method includes the following steps: placing $CuCl_2 \cdot 2H_2O$ and 4-iodopyrazole in a container at a certain molar ratio; adding absolute ethanol and dichloromethane to the container at a certain volume ratio to completely dissolve the $CuCl_2 \cdot 2H_2O$ and the 4-iodopyrazole; sealing and puncturing the container, and leaving the container to stand at room temperature for 2-4 days to obtain green bulk crystals; and washing, filtering and drying the green bulk crystals to obtain the 4-iodopyrazole coordination compound. The copper chloride-linked 4-iodopyrazole coordination compound prepared in the present application is a dual-function inhibitor, has a high inhibition rate, low dosage, good stability, difficulty in leaching with water, low toxicity, and low environmental impact, and thus can be used in fertilizers.

3 Claims, 2 Drawing Sheets

(51) Int. Cl.
    *C05G 3/90*     (2020.01)
    *C07F 1/08*     (2006.01)

(56) References Cited

FOREIGN PATENT DOCUMENTS

| CN | 108864209 A | 11/2018 |
|---|---|---|
| CN | 109293686 A | 2/2019 |
| CN | 109456343 A | 3/2019 |

OTHER PUBLICATIONS

Da Silva, Patricia B.; Terra, Paulo H.; Frem, Regina C. G.; Netto, Adelino V. G.; Mauro, Antonio E., "Synthesis, characterization, and investigation of the thermal behaviour of Cu(II) pyrazolyl complexes", Journal of Thermal Analysis and Calorimetry (2011), 106(2), 495-499.*

First Office Action issued in counterpart Chinese Patent Application No. 202410405372.6, dated May 8, 2024.

Notification to Grant Patent Right for Invention issued in counterpart Chinese Patent Application No. 202410405372.6, dated May 23, 2024.

\* cited by examiner

4-IODOPYRAZOLE COORDINATION COMPOUND AND PREPARATION METHOD AND USE THEREOF

CROSS-REFERENCE TO RELATED APPLICATIONS

This application claims priority to Chinese Patent Application No. 202410405372.6, filed on Apr. 7, 2024, the content of which is incorporated herein by reference in its entirety.

TECHNICAL FIELD

The present application belongs to the technical field of heterocyclic compounds and uses thereof, and in particular relates to a 4-iodopyrazole coordination compound and a preparation method and use thereof, where a copper atom in copper chloride is used as a linking node, 4-iodopyrazole is used as an organic ligand, and the 4-iodopyrazole coordination compound is synthesized by a solution volatilization method at a certain ratio.

BACKGROUND

As a derivative of pyrazole, 4-iodopyrazole has the potential to be an effective nitrification inhibitor to inhibit oxidation of ammonium ions in soil. Therefore, it can be used as a nitrification inhibitor in fertilizers to improve utilization rate of nitrogen elements in fertilizers and reduce losses. However, 4-iodopyrazole itself has a low melting point, easy volatilization, strong irritability, flammability and other dangerous characteristics, and is easy to decompose at high temperature, resulting in large loss when added to fertilizers. To address the instability of 4-iodopyrazole and expand use thereof in agriculture and fertilizer field, it is necessary to modify 4-iodopyrazole.

Adding urease inhibitors and nitrification inhibitors to fertilizers is an effective strategy to improve fertilizer efficiency. These two inhibitors each have a unique mechanism of action, which reduces volatilization loss of ammonia and production of nitrate nitrogen, thus reducing leaching loss of nitrogen fertilizers, jointly helping to improve the utilization efficiency of nitrogen fertilizers and reduce environmental pollution.

SUMMARY

In order to solve the above technical problems, the present application provides a 4-iodopyrazole coordination compound and a preparation method and use thereof, where 4-iodopyrazole is used as a ligand to form coordination bonds with metal ions or other molecules, thereby stabilizing the structure of the coordination compound, and the coordination compound has a good inhibitory effect on urease and nitrobacteria, effectively delaying the release period of nitrogen fertilizers.

The present application is achieved by providing a method for preparing a 4-iodopyrazole coordination compound, including the following steps:

1) placing $CuCl_2 \cdot 2H_2O$ and 4-iodopyrazole in a container at a certain molar ratio;
2) adding absolute ethanol and dichloromethane to the container at a certain volume ratio to completely dissolve the $CuCl_2 \cdot 2H_2O$ and the 4-iodopyrazole;
3) sealing and puncturing the container, and leaving the container to stand at room temperature for 2-4 days to obtain green bulk crystals; and
4) washing, filtering and drying the green bulk crystals to obtain the 4-iodopyrazole coordination compound.

Preferably, in step 1), the molar ratio of the $CuCl_2 \cdot 2H_2O$ to the 4-iodopyrazole is 1:1-2.

Further preferably, in step 2), the volume ratio of the absolute ethanol to the dichloromethane is 1:2-4.

The present application provides a 4-iodopyrazole coordination compound prepared by the method for preparing a 4-iodopyrazole coordination compound described above.

Preferably, a crystal form of the 4-iodopyrazole coordination compound is monoclinic system, and a space group thereof is P 21/c.

The present application provides use of a 4-iodopyrazole coordination compound as a urease inhibitor in a fertilizer.

The present application provides another use of the 4-iodopyrazole coordination compound as a nitrification inhibitor in the fertilizer.

Preferably, in the above uses, the fertilizer is a nitrogen fertilizer.

Further preferably, the nitrogen fertilizer is urea.

Compared with the prior art, the present application has the following advantages.

The present application provides a 4-iodopyrazole coordination compound, and a preparation method and use thereof. The copper chloride-linked 4-iodopyrazole coordination compound prepared in the present application has a good inhibitory effect on urease and nitrobacteria, slows down the hydrolysis rate of urea and reduces production of nitrate nitrogen, thus ensuring that nitrogen fertilizer exists in soil for a longer time and is sufficiently absorbed and used by plants. The preparation method is simple, the solvents used are only absolute ethanol and dichloromethane, the preparation process does not require energy consumption, does not produce secondary pollution, and has a good application prospect. The copper chloride-linked 4-iodopyrazole coordination compound prepared in the present application is a dual-function inhibitor, has a high inhibition rate, low dosage, good stability, difficulty in leaching with water, low toxicity, and low environmental impact, and thus can be used in fertilizers.

DETAILED DESCRIPTION OF THE EMBODIMENTS

The present application is further explained and illustrated in conjunction with specific embodiments, which are not intended to limit the scope of the present application.

In the present application, a solvent volatilization method is used to bridge 4-iodopyrazole through a central copper ion in copper chloride, which increases the stability of the 4-iodopyrazole and further optimizes and improves properties thereof, so that the 4-iodopyrazole having only the function of a nitrification inhibitor also has the function of inhibiting the activity of urease, and the inhibitor having the dual function of inhibiting urease and nitrification has significant advantages in improving utilization rate of fertilizer, reducing environmental pollution and lowering use cost. In the future, with the continuous advancement of agricultural technologies and the improvement of environmental protection requirements, such inhibitors are expected to play a more important role in agricultural production.

Embodiment 1

(I) Preparation Method

Totally 0.0248 g (0.2 mmol) of $CuCl_2·2H_2O$ and 0.0148 g (0.2 mmol) of 4-iodopyrazole were respectively placed into a 50 ml conical flask, 5 mL of absolute ethanol and 10 mL of dichloromethane were added to completely dissolve the $CuCl_2·2H_2O$ and the 4-iodopyrazole. After the conical flask was sealed and punctured, the conical flask was left standing at room temperature for about 2 days to obtain green bulk crystals, and the bulk crystals were washed, filtered and dried to obtain a copper chloride-linked 4-iodopyrazole coordination compound with a yield of 98%.

(II) Testing

Figure 1:
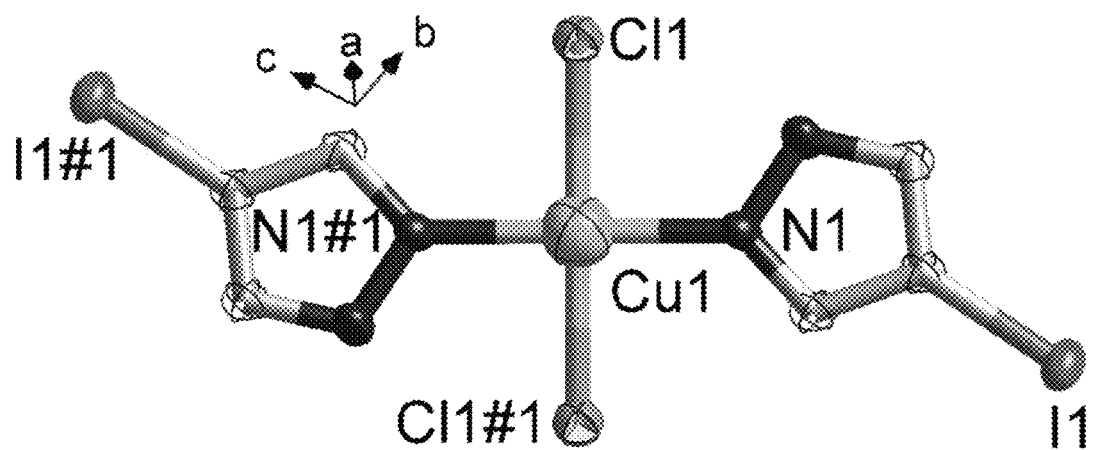
FIG. 1 is a single crystal thermal ellipsoid plot of a 4-iodopyrazole coordination compound prepared in Embodiment 1.

Diffraction intensity data of single crystals were collected on a Bruker D8-ray diffractometer using graphite-monochromatized Mo Kα ($\lambda$=0.71073 Å) radiation as a diffraction light source. The prepared copper chloride-linked 4-iodopyrazole coordination compound was subjected to SC-XRD to obtain corresponding data, and a structural diagram as shown in FIG. 1 was further obtained. A crystal form thereof belongs to a monoclinic crystal system, and a space group thereof is P 21/c. In an asymmetric unit, the structure of the 4-iodopyrazole coordination compound synthesized in the present application is as follows: the central ion copper (II) had a tetrahedral geometrical configuration and was coordinated with two nitrogen atoms of two 4-iodopyrazole ligand donor atoms and two chlorine atoms in the $CuCl_2·2H_2O$. Synthesizing the copper chloride-linked 4-iodopyrazole coordination compound can enhance the stability thereof and enable it to have a good urease inhibition effect. Crystallographic parameters thereof are as shown in Table 1.

Figure 2:
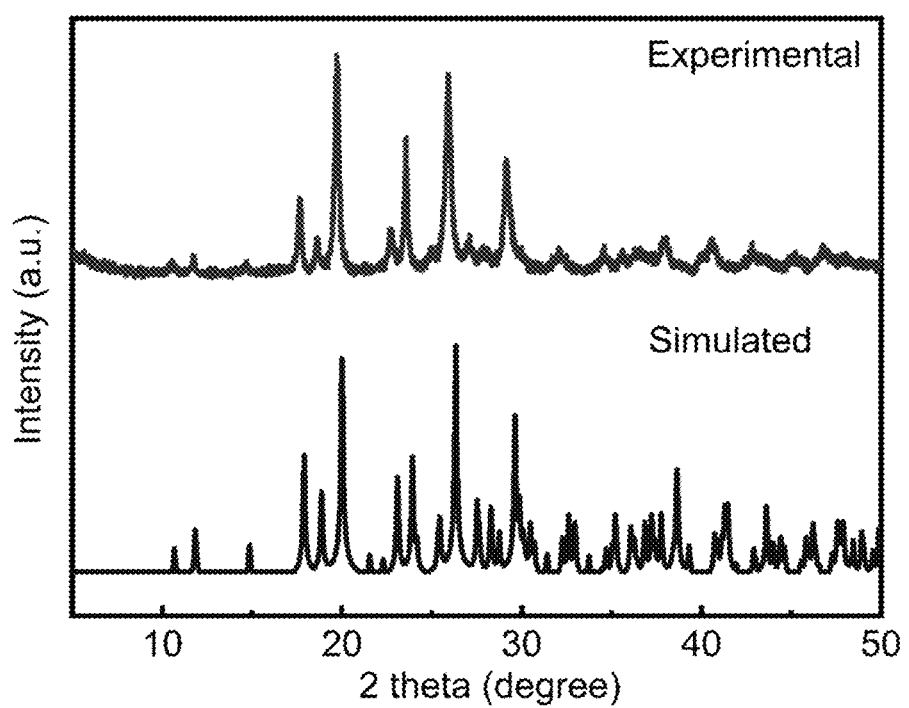
FIG. 2 is a comparison of a powder X-ray diffraction pattern of the 4-iodopyrazole coordination compound prepared in Embodiment 1 with a simulated pattern of single crystal data.

Powder diffraction experiments were carried out on the crystals using a Bruker D8 Advance X-ray powder diffractometer. Graphite-monochromatized CuKα-radiation with a wavelength of $\lambda$=1.54056 Å, a solid-state detector, a step size of 0.02°, a step time of 0.1 sec, and a scanning range $5°\leq 2\theta \leq 45°$ was used. The powder X-ray diffraction pattern (Experimental) of the prepared copper chloride-linked 4-iodopyrazole coordination compound matched a simulated pattern of single crystal data (Simulated) (FIG. 2).

TABLE 1

Crystallographic Data Sheet of Coordination Compound

| Empirical formula | $C_6H_6Cl_2CuI_2N_4$ |
|---|---|
| Formula weight | 522.40 |
| Temperature/K | 296 |
| Crystal system | Monoclinic |
| Space group | P 21/c |
| a/Å | 4.0669(7) |
| b/Å | 15.134(3) |
| c/Å | 10.1004(17) |
| α/° | 90 |

TABLE 1-continued

Crystallographic Data Sheet of Coordination Compound

| β/° | 94.466(5) |
|---|---|
| γ/° | 90 |
| Volume/Å$^3$ | 619.78(19) |
| Z | 2 |
| Calculated density/cm$^3$ | 2.799 |
| μ/mm$^{-1}$ | 7.147 |
| F(000) | 478.0 |
| Rint | 0.0819(1213) |
| S | 1.063 |
| R1/wR2 | 0.0819/0.2335 |

Embodiment 2

Totally 0.0248 g (0.2 mmol) of $CuCl_2·2H_2O$ and 0.0148 g (0.2 mmol) of 4-iodopyrazole were respectively placed into a 50 ml conical flask, 5 mL of absolute ethanol and 15 mL of dichloromethane were added to completely dissolve them. After the conical flask was sealed and punctured, the conical flask was left standing at room temperature for about 3 days to obtain green bulk crystals, and the bulk crystals were washed, filtered and dried to obtain a copper chloride-linked 4-iodopyrazole coordination compound with a yield of 95%.

Embodiment 3

Totally 0.0248 g (0.2 mmol) of $CuCl_2·2H_2O$ and 0.0148 g (0.2 mmol) of 4-iodopyrazole were respectively placed into a 50 ml conical flask, 5 mL of absolute ethanol and 20 mL of dichloromethane were added to completely dissolve them. After the conical flask was sealed and punctured, the conical flask was left standing at room temperature for about 4 days to obtain green bulk crystals, and the bulk crystals were washed, filtered and dried to obtain a copper chloride-linked 4-iodopyrazole coordination compound with a yield of 88%.

Embodiment 4

Totally 0.0248 g (0.2 mmol) of $CuCl_2·2H_2O$ and 0.0296 g (0.4 mmol) of 4-iodopyrazole were respectively placed into a 50 ml conical flask, 5 mL of absolute ethanol and 10 mL of dichloromethane were added to completely dissolve them. After the conical flask was sealed and punctured, the conical flask was left standing at room temperature for about 2 days to obtain green bulk crystals, and the bulk crystals were washed, filtered and dried to obtain a copper chloride-linked 4-iodopyrazole coordination compound with a yield of 58%.

Embodiment 5

Totally 0.0248 g (0.2 mmol) of $CuCl_2·2H_2O$ and 0.0296 g (0.4 mmol) of 4-iodopyrazole were respectively placed into a 50 ml conical flask, 5 mL of absolute ethanol and 15 mL of dichloromethane were added to completely dissolve them. After the conical flask was sealed and punctured, the conical flask was left standing at room temperature for about 3 days to obtain green bulk crystals, and the bulk crystals were washed, filtered and dried to obtain a copper chloride-linked 4-iodopyrazole coordination compound with a yield of 60%.

Embodiment 6

Totally 0.0248 g (0.2 mmol) of $CuCl_2 \cdot 2H_2O$ and 0.0296 g (0.4 mmol) of 4-iodopyrazole were respectively placed into a 50 ml conical flask, 5 mL of absolute ethanol and 20 mL of dichloromethane were added to completely dissolve them. After the conical flask was sealed and punctured, the conical flask was left standing at room temperature for about 4 days to obtain green bulk crystals, and the bulk crystals were washed, filtered and dried to obtain a copper chloride-linked 4-iodopyrazole coordination compound with a yield of 43%.

Embodiment 7

1. A method for determining activity of a urease inhibitor activity is as follows.

Figure 3:
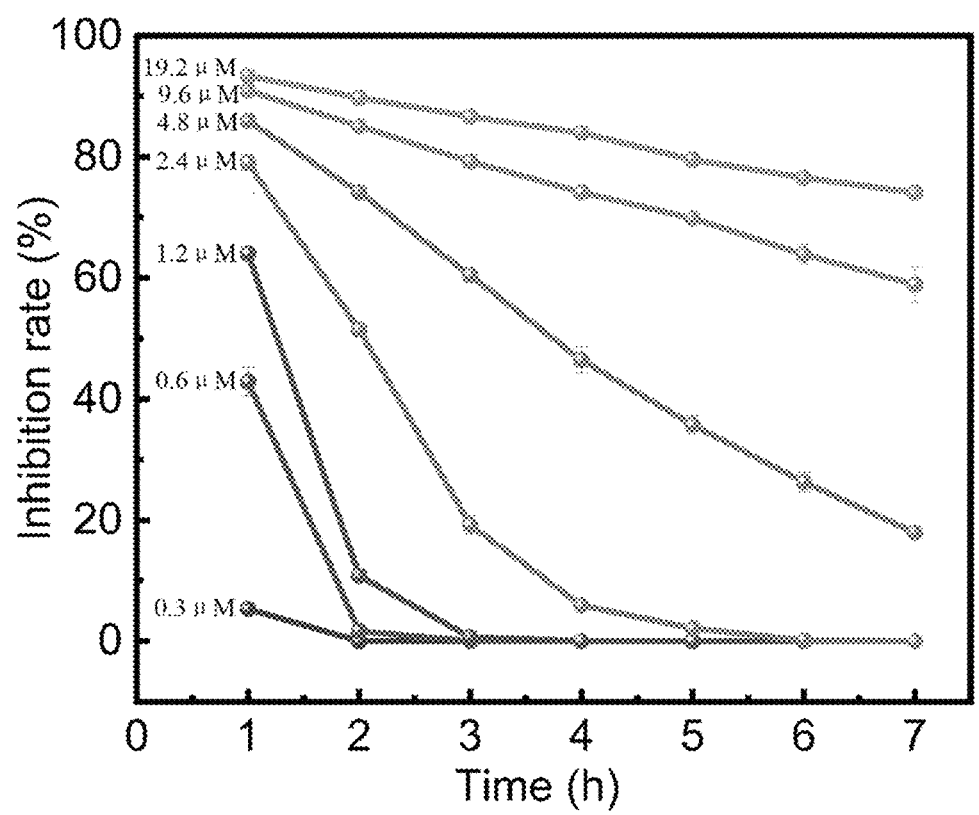
FIG. 3 is a graph showing inhibition of urease by different concentrations of the 4-iodopyrazole coordination compound prepared in Embodiment 1.

Totally 1 mL (10 KU/L) of urease and 1 mL of coordination polymer samples with different contents (the contents were 0.3 μM, 0.6 μM, 1.2 μM, 2.4 μM, 4.8 μM, 9.6 μM and 19.2 μM, respectively, and the samples were dissolved in DMSO, with DMSO: $H_2O$=1:1) were evenly mixed, then preincubated in a 37° C. thermostatic shaking incubator for 1 h, and then 8 mL of phosphate buffer with pH=6.8 (containing 500 mM urea and 0.002% phenol red indicator) was added to obtain a solution with the pH range of 6.8-7.7, absorbance of the resulting solution was measured at 570 nm with an ultraviolet spectrometer every 1 h, and the inhibition rate of urease by the coordination polymer with different content was calculated (FIG. 3). An endpoint of the testing was determined by the phenol red indicator, and the testing was stopped when the solution changed from pale yellow to red. The $IC_{50}$ was calculated using the modified Karber method, and the $IC_{50}$ of the copper chloride-linked 4-iodopyrazole coordination compound was 2.58±0.04 μM, which proved that the copper chloride-linked 4-iodopyrazole coordination compound can be used as a urease inhibitor with a low median inhibition concentration and small dosage of additives.

2. A method for determining nitrification inhibition activity is as follows.

Totally 0 g (control), 0.003 g, 0.005 g, 0.007 g and 0.010 g of the copper chloride-linked 4-iodopyrazole coordination compound prepared in Embodiment 1 were respectively weighed, and placed into 500 ml conical flasks respectively; 10.00 g of air-dry soil, 0.10 g of urea and 100 mL of phosphate buffer were added to each flask; the conical flasks were simultaneously place into a thermostatic culture oscillator (180 rpm) for oscillation for 48 h, and then the resulting solutions were filtered to determine mass fraction $\omega_1$ of nitrate nitrogen (including nitrite nitrogen) in the sample and the control sample solution respectively.

Calculation of nitrification inhibition rate: the nitrification inhibition rate of binuclear ligands with different addition amounts was calculated, and the results are shown in Table 2.

$$dN = \frac{\omega_2 - \omega_1}{\omega_2} \times 100$$

where dN is nitrification inhibition rate (%);
- $\omega_1$ is mass fraction of nitrate nitrogen (including nitrite nitrogen) in the sample; and
- $\omega_2$ is mass fraction of nitrate nitrogen (including nitrite nitrogen) in the control sample, and $\omega_2$=948.6.

TABLE 2

Nitrification inhibition of copper chloride-linked 4-iodopyrazole compound

| Mass of copper chloride-linked 4-iodopyrazole compound (g) | Mass fraction of nitrate nitrogen in the sample solution $\omega_1$ | Nitrification inhibition rate dN (%) |
| --- | --- | --- |
| 0.03 | 861.7 | 9.16 |
| 0.05 | 855.8 | 9.79 |
| 0.07 | 843.4 | 11.09 |
| 0.10 | 800.9 | 15.57 |

It can be seen from Table 2 that the copper chloride-linked 4-iodopyrazole coordination compound can be used as a nitrification inhibitor, with the nitrification inhibition rates thereof greater than 9%. When the addition amount increased gradually, the nitrification inhibition rate did not change greatly, and the optimal addition amount was 4% considering the cost factor. In summary, the present application uses 4-iodopyrazole as a ligand, and can effectively improve the stability of the 4-iodopyrazole coordination compound through copper chloride linkage, and can be used as a dual-function inhibitor of urease and nitration in fertilizer urea.

What is claimed is:

1. A preparation method and use of a 4-iodopyrazole coordination compound, wherein the 4-iodopyrazole coordination compound is used as a urease inhibitor in a nitrogen fertilizer, comprising the following steps:
   - I, placing $CuCl_2 \cdot 2H_2O$ and 4-iodopyrazole in a container at a molar ratio of 1:1-2;
   - II, adding absolute ethanol and dichloromethane to the container to completely dissolve the $CuCl_2 \cdot 2H_2O$ and the 4-iodopyrazole, a volume ratio of the absolute ethanol to the dichloromethane is 1:2-4;
   - III, sealing and puncturing the container, and leaving the container to stand at room temperature for 2-4 days to obtain green bulk crystals; and
   - IV, washing, filtering and drying the green bulk crystals to obtain the 4-iodopyrazole coordination compound, and using the obtained 4-iodopyrazole coordination compound as the urease inhibitor in the nitrogen fertilizer.

2. The preparation method and use of the 4-iodopyrazole coordination compound according to claim 1, wherein a crystal form of the 4-iodopyrazole coordination compound is monoclinic system, and a space group thereof is P 21/c.

3. The preparation method and use of the 4-iodopyrazole coordination compound according to claim 1, wherein the nitrogen fertilizer is urea.

* * * * *